Figure 1:
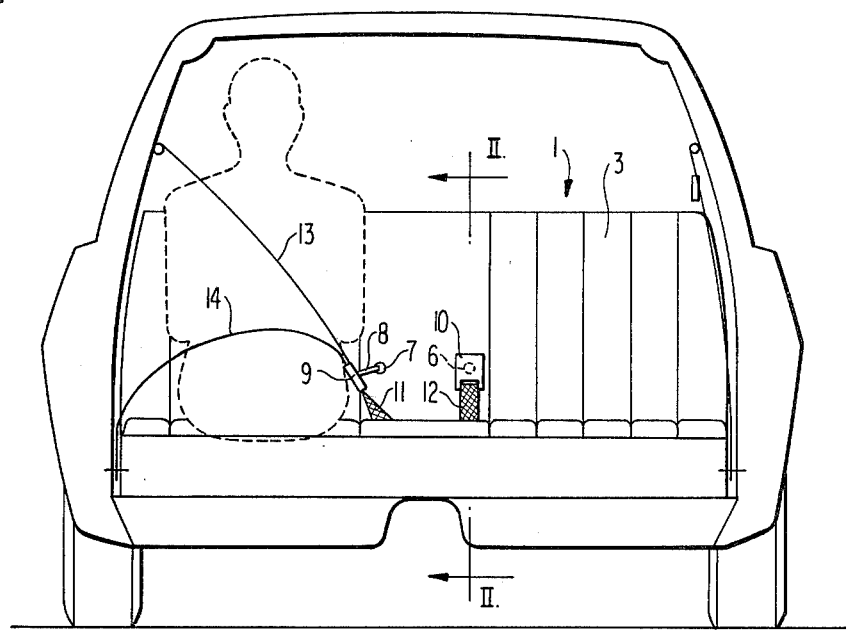

United States Patent [19]

Breitschwerdt et al.

[11] 4,210,365
[45] Jul. 1, 1980

[54] FASTENING ARRANGEMENT OF SAFETY BELT LOCKS AT MOTOR VEHICLE SEATS

[75] Inventors: Werner Breitschwerdt, Stuttgart; Walter Jahn; Herbert Rapp, both of Sindelfingen; Wilhelm Klein, Aidlingen, all of Fed. Rep. of Germany

[73] Assignee: Daimler-Benz Aktiengesellschaft, Fed. Rep. of Germany

[21] Appl. No.: 898,185

[22] Filed: Apr. 20, 1978

[30] Foreign Application Priority Data

Apr. 23, 1977 [DE] Fed. Rep. of Germany ....... 2718140

[51] Int. Cl.² ..................... A62B 35/00; A47C 31/00
[52] U.S. Cl. ..................................... 297/481; 297/474
[58] Field of Search .................. 297/385, 389, 48; 280/744

[56] References Cited

U.S. PATENT DOCUMENTS

| | | | |
|---|---|---|---|
| 2,480,915 | 9/1949 | George | 297/388 |
| 2,964,100 | 12/1960 | McCall | 297/388 |
| 3,076,679 | 2/1963 | Lorber | 297/385 |
| 3,144,274 | 8/1964 | Harris | 297/385 |
| 3,219,387 | 11/1965 | Peters | 297/388 |
| 3,330,599 | 7/1967 | Inoue | 297/388 |
| 3,439,952 | 4/1969 | Jantzen | 297/385 X |
| 3,740,094 | 6/1973 | Hornyak | 297/385 |

FOREIGN PATENT DOCUMENTS 2358232  8/1974  Fed. Rep. of Germany ........... 297/385

*Primary Examiner*—James T. McCall
*Attorney, Agent, or Firm*—Craig & Antonelli

[57] ABSTRACT

A fastening arrangement of safety belt locks at motor vehicle seats, especially at rear seat benches which are adapted to be converted into an additional storage space by folding-over the seat cushion and the backrest; elastic means are provided which during non-use hold fast the safety belt locks together with the belt band directly on the front side of the backrest in the stretched-out position.

8 Claims, 2 Drawing Figures

U.S. Patent

Jul. 1, 1980

4,210,365

FASTENING ARRANGEMENT OF SAFETY BELT LOCKS AT MOTOR VEHICLE SEATS

The present invention relates to a fastening arrangement of safety belt locks at motor vehicle seats, especially at rear seat benches, which are adapted to be converted into an additional storage space by folding over the seat cushion and the backrest.

With the present-day customary safety belts for rear seat benches of motor vehicles, the belt band ends which are extended to the rear between the backrest and the seat cushion together with the belt locks fastened thereon are in an untidy condition and are loosely on the seat cushion. When folding back the seat cushion into its use position, attention has to be paid that the belt locks are not covered or wedged in.

The present invention is therefore concerned with the task to avoid the aforementioned disadvantages with means simple from a structural and manufacturing point of view and at the same time to achieve a better handling.

The underlying problems are solved according to the present invention in that elastic means are provided which hold the safety belt locks together with belt bands during non-use directly on the front side of the backrest in the stretched-out position.

In one embodiment of the present invention, the elastic means consists of a very strong stretchable tension or drawspring which is secured at the back wall of the backrest and is extended through a corresponding opening in the backrest to the front side thereof and is connected with the belt lock.

In another embodiment of the present invention, the elastic means consists of a strongly stretchable rubber band.

Accordingly, it is an object of the present invention to provide a fastening arrangement of safety belt locks at motor vehicle seats, especially at convertible rear seats adapted to be folded over to obtain additional storage space, which avoids by simple means the aforementioned shortcomings and drawbacks encountered in the prior art.

Another object of the present invention resides in a fastening arrangement of safety belt locks and belt bands secured thereto which eliminates the likelihood that the belt locks will be left loosely on the seat cushion in a haphazardous non-tidy manner.

A further object of the present invention resides in a fastening arrangement of safety belt locks in motor vehicle seats, especially in motor vehicle rear seats or rear seat benches, which avoids the aforementioned shortcomings and drawbacks by extremely simple means that involve relatively few parts and can be manufactured and installed in a simple manner.

Another object of the present invention resides in a fastening arrangement of safety belt locks at motor vehicle seats of the type described above which improves the handling of the safety belts for the passengers.

Figure 2:
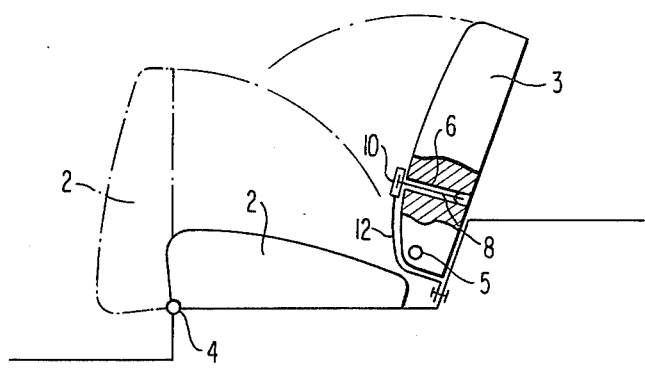

These and other objects, features and advantages of the present invention will become more apparent from the following description when taken in connection with the accompanying drawing which shows, for purposes of illustration only, one embodiment in accordance with the present invention and wherein:

FIG. 1 is a somewhat schematic front elevational view illustrating a rear seat bench of a motor vehicle with a fastening arrangement of the safety belt locks and safety belts thereof according to the present invention; and FIG. 2 is a schematic cross-sectional view, taken along line II—II of FIG. 1.

Referring now to the drawing wherein like reference numerals are used throughout the two views to designate like parts, FIGS. 1 and 2 illustrate in a motor vehicle a rear seat bench generally designated by reference numeral 1 which consists of a seat cushion 2 adapted to be tilted up and of an upholstered backrest 3 adapted to be folded down. The points of rotation, about which the seat parts 2 and 3 can be folded, are indicated schematically by reference numerals 4 and 5. Two openings 6 and 7 which extend through the backrest are disposed in the backrest 3 within the area of the motor vehicle center approximately at hip height of the vehicle passengers for the accommodation of the elastic means 8 which can be constructed as strongly stretchable drawspring or as rubber band. The elastic means 8 are secured within the area of the back wall of the backrest 3 and are extended through the openings 6 and 7 to the front side of the backrest 3 and are securely connected thereat with the safety belt locks 9 and 10. It is achieved therewith that the belt locks 9 and 10 at the respective belt band 11 and 12 are retained during non-use of the safety belts directly on the front side of the upholstered backrest 3 in a stretched-out position.

In FIG. 1 a vehicle passenger is indicated in contours in dash line on the left side of this figure who is secured by a fastened three-point safety belt, i.e., by a shoulder belt 13 and by a lower belt 14. The belt-lock 9 at the belt band 11 is thereby pulled out of its position against the force of the retaining means 8. In contrast thereto, the belt lock 10 at the belt band 12 is in the retained position according to the present invention during non-use as shown in elevation on the right side of FIG. 1 and schematically in cross section in FIG. 2.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A safety belt arrangement for vehicle passenger seats of the type having a seat cushion and a backrest, said arrangement comprising:
   first and second safety belt means,
   a safety belt lock on said first safety belt means for locking said first and second safety belt means together to hold a passenger in the seat,
   and elastic holding means for automatically holding said first safety belt means and said safety belt lock against a front side of said backrest in a storage position whenever said safety belt means are unlocked, said elastic holding means being disposed to act on said first safety belt means in a direction other than the extension direction of said first safety belt means so that said storage position is an accessible unretracted position of said first belt means,
   and wherein said elastic holding means is continuously connected directly to said safety belt lock.

2. An arrangement according to claim 1, wherein said elastic holding means extends through the backrest to the front side thereof at a position vertically spaced from the extension of said first safety belt means adjacent the bottom of the backrest.

3. An arrangement according to claim 1, wherein the passenger seat is a rear seat of a passenger motor vehicle which is adapted to be converted into an additional storage space by folding over the seat cushion and the backrest, wherein the backrest is pivotal about a pivot axle located adjacent the bottom of the backrest, wherein the first safety belt means extends underneath said pivot axle, and wherein said elastic holding means extends through said backrest at a position spaced vertically above said pivot axle.

4. An arrangement according to claim 1, wherein the elastic holding means is secured at the back wall of the backrest and is extended through an opening in the backrest to the front side of the backrest where it is connected to the safety belt lock.

5. An arrangement according to claim 4, wherein the passenger seat is a rear seat of a passenger motor vehicle which is adapted to be converted into an additional storage space by folding over the seat cushion and the backrest, wherein the backrest is pivotal about a pivot axle located adjacent the bottom of the backrest, wherein the first safety belt means extends underneath said pivot axle, and wherein said elastic holding means extends through said backrest at a position spaced vertically above said pivot axle.

6. An arrangement according to claim 4, wherein the elastic holding means is in the form of a strongly stretchable drawspring.

7. An arrangement according to claim 4, wherein the elastic holding means is in the form of a strongly stretchable band.

8. An arrangement according to claim 3, wherein the seat is a bench seat.

* * * * *